June 3, 1924.

J. W. KITTREDGE

HOISTING BLOCK

Filed Feb. 4, 1920    3 Sheets-Sheet 1

1,496,273

WITNESSES:
Edwin J. Wright

INVENTOR.
BY John W. Kittredge
ATTORNEY

Patented June 3, 1924.

1,496,273

UNITED STATES PATENT OFFICE.

JOHN W. KITTREDGE, OF AKRON, OHIO.

HOISTING BLOCK.

Application filed February 4, 1920. Serial No. 356,235.

*To all whom it may concern:*

Be it known that I, JOHN W. KITTREDGE, a citizen of the United States, residing at Akron, in the county of Summit and State of Ohio, have invented a new and useful Hoisting Block, of which the following is a full, clear, and exact description.

My invention relates particularly to "chain blocks" operated by hand, but it may be power driven, may have cables instead of chains, and have many other modifications.

The objects of my invention are:—

1st. To provide a hoisting mechanism of interlocking parts, insuring positive action and absolute safety.

2nd. To provide a brake which will release easily under the action of the driving wheel, but which will set instantly and always under the action of the load, again effecting safety.

3rd. To have all mechanism enclosed and thereby protected from dirt and injury, further inuring to safety.

I attain these objects by the mechanism shown in the accompanying drawings, in which,—

Figure 1:
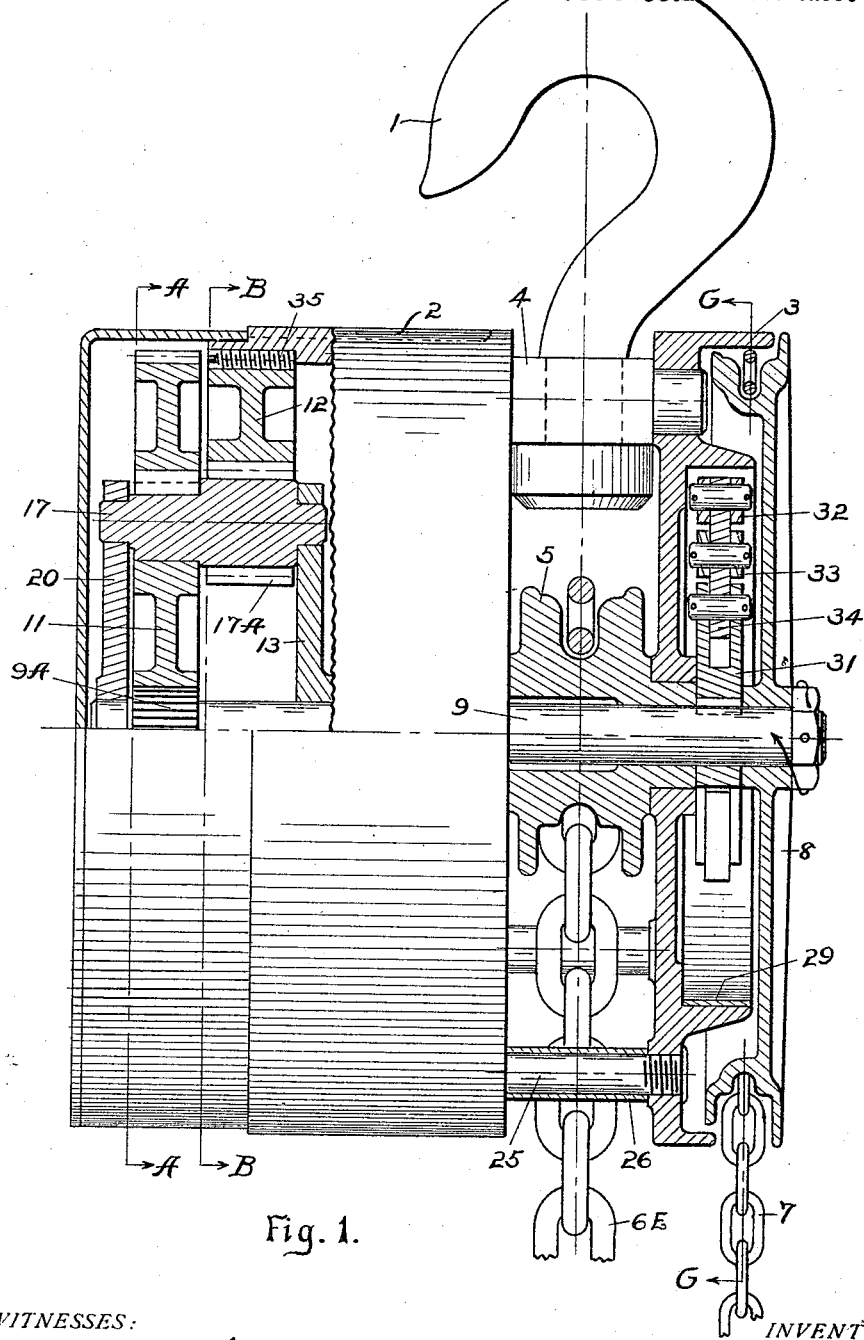
Figure 2:
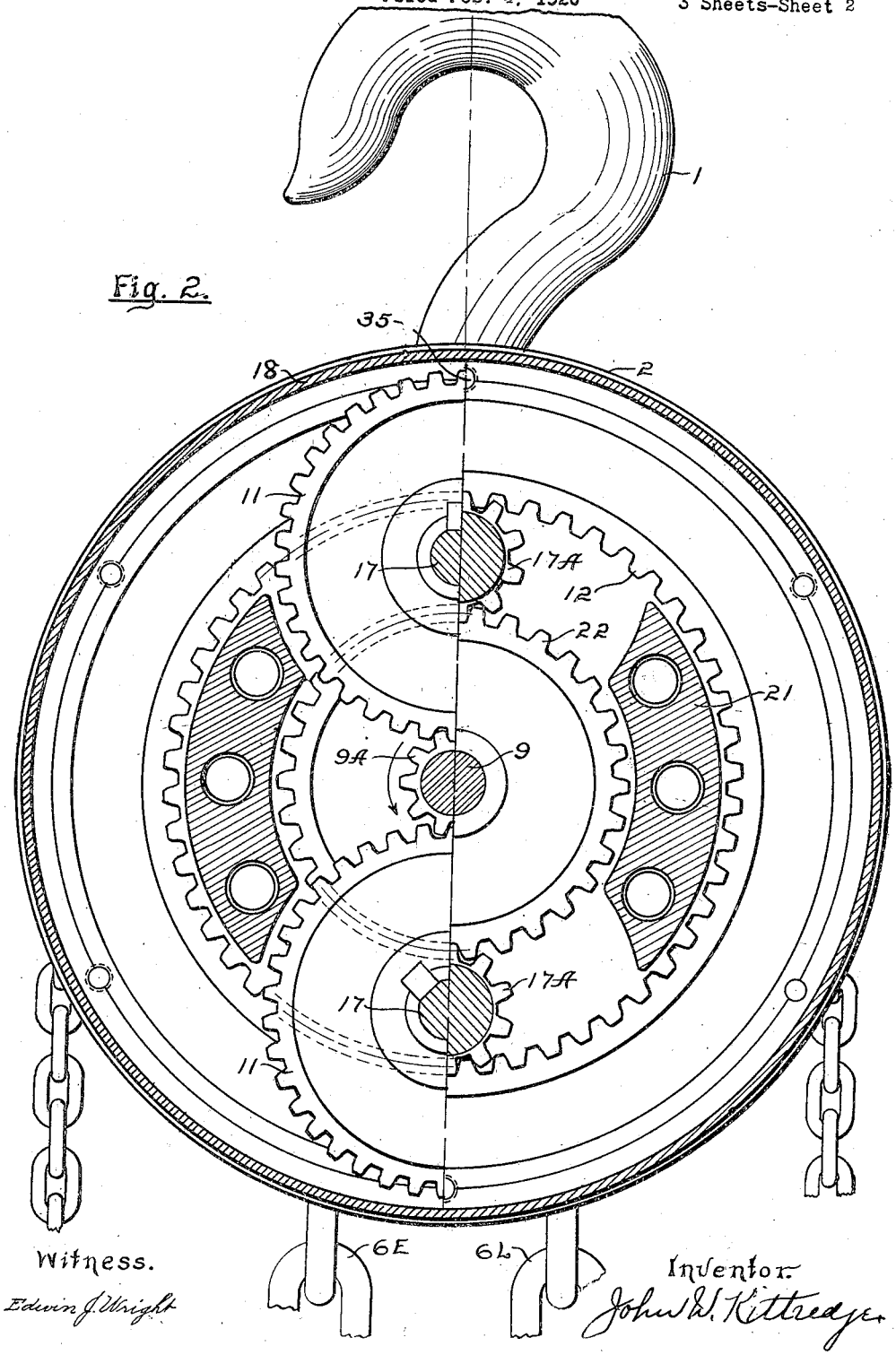
Figure 3:
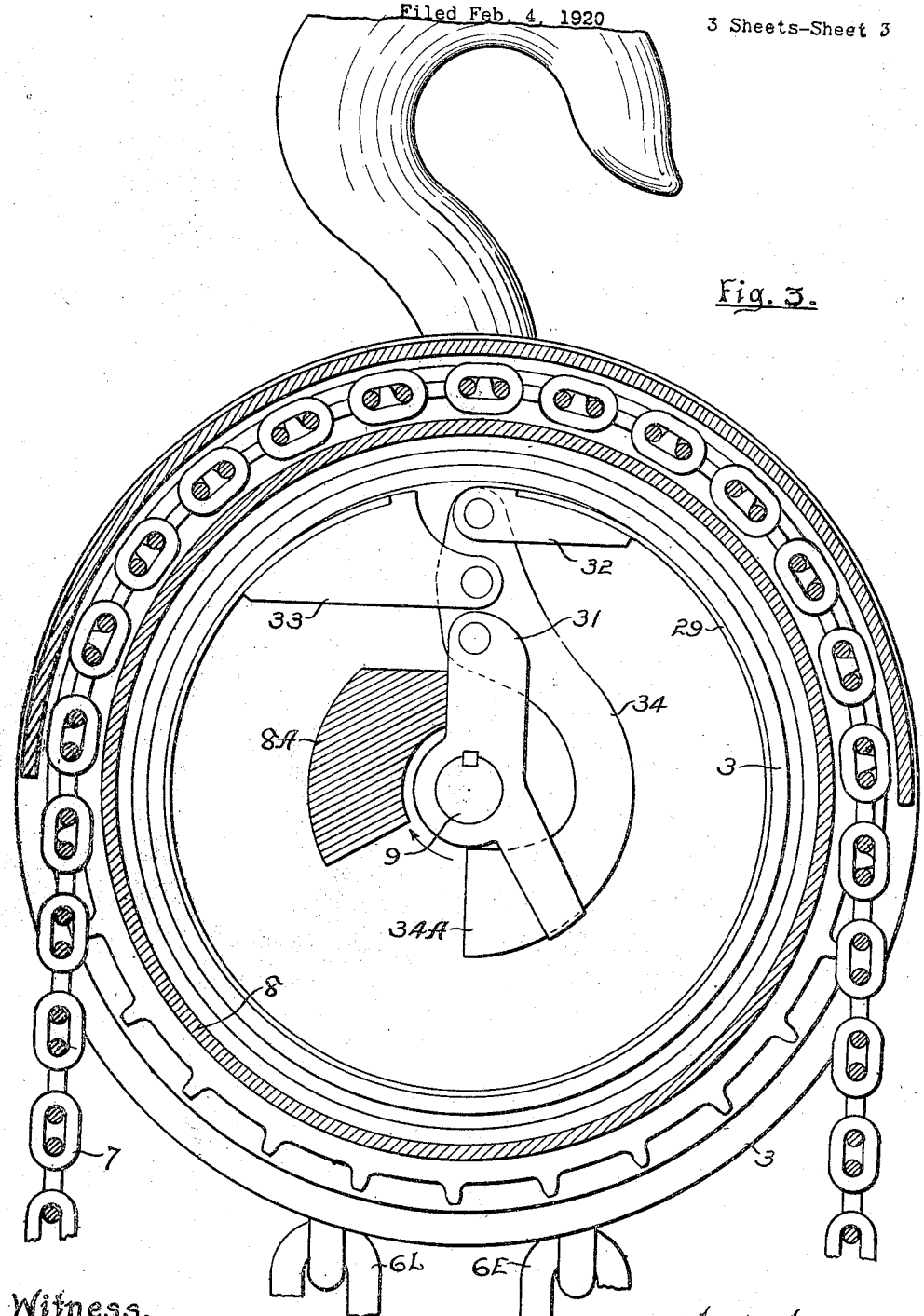

Fig. 1 is a longitudinal section. The left half of Fig. 2 is a transverse section on line A—A of Fig. 1; and the right half of Fig. 2 is a transverse section on line B—B of Fig. 1; Fig. 2 entire showing the arrangement of the reducing gears. Fig. 3 is a transverse section on line G—G of Fig. 1, showing the brake mechanism.

For clearness of description, a given part is designated by a numeral as 16, and different edges or faces of that part by that numeral with letters, as 16$^A$, 16$^B$, etc. A given piece carries the same number throughout the several views.

The block is hung from an overhead support by the hook 1, which is attached to the gear case 2, and the brake case 3 by the swivel bar 4. Bolts 25 and spacers 26 bind the cases firmly together. A sprocket wheel 5 is journaled in bearings in the cases 2 and 3 and it carries a lifting chain 6. The loaded end of the chain is 6$^L$ and the empty end is 6$^E$. The arrows, in every case, indicate the parts running in the direction to raise the load. The shaft 9 passes entirely through the load sprocket 5 and is journaled in bearings therein. A hand chain 7 actuates the sprocket wheel 8, which, in turn, actuates the shaft 9, as hereinafter described, Integral with the shaft 9, or ridgily attached to it, is the pinion 9$^A$. It meshes with the planetary gears 11. Gears 11 are mounted on shafts 17 and keyed rigidly thereto. The shafts 17 are journaled in the carrier plates 13 and 20. These carrier plates are bolted rigidly together with the spacers 21 between them, and the plates and spacers then revolve as a single rigid piece about the central axis of the machine. Integral with the shafts 17, are the pinions 17$^A$ meshing with the annular gear 12, which is keyed fast in the gear case 2, by the threaded keys 35.

As the shaft 9 and the pinion 9$^A$ revolve, the gears 11 and pinions 17$^A$ revolve on their own axes and also revolve around the shaft 9, as the pinions 17$^A$ follow around the annular surface of the stationary gear 12. The shafts 17 actuate the carrier plates 13 and 20, moving them around the shaft 9 in the same direction as its rotation, but much more slowly, depending on the ratios of the reducing gears. The system forms a planetary gear train, and the carrier plates 13 and 20 actuate the lifting sprocket 5.

In order that the block shall hold its load securely, except when it is run down by the operator, a brake is provided. This consists of an expanding band 29 seated on the interior surface of the brake case 3. The band 29 has shoes 32 and 33 securely fastened to its ends. The crank 31 is keyed to the shaft 9, while the hand sprocket 8 turns freely on the said shaft through a partial revolution. The lever 34 is attached to crank 31 and to the brake shoes 32 and 33 by pin connections as shown. The lug 8$^A$ projects from the face of the sprocket 8 and is integral therewith. Normally, the spring 29 expands against its enclosing walls. The load tends to turn the shaft 9 opposite to the arrow. Shaft 9 acting through crank 31, lever 34 and shoes 32 and 33, presses the band still more firmly against the walls, and the greater the torque on the shaft, the more tightly does the band 29 grip. When, however, the operator turns the sprocket 8 arrow-wise, or in the direction of lift, the lug 8^A engages the crank 31; the crank 31 actuates the lever 34, and it contracts the band and allows it to turn freely. When he turns the sprocket 8 in the opposite direction, or in the direction of lowering, the lug 8^A engages the end 34^A of the lever 34; it again contracts the band and allows it to turn freely.

I claim:

1. In combination, a hoist comprising a frame, a driving member, a driven member, driving means from the driving member to the driven member, an annular wall, a flexible band within said wall, a lever, a connection from the lever to each end of the said band, the said driving member as it turns in the direction of lowering adapted to engage the said lever and thereby contract the said band, a connection from the lever to an element of the driving means, the arrangement being such that as the said element rotates in the direction of lift it contracts the band, and as it tends to rotate in the direction of lowering it expands the band against the enclosing wall.

2. In combination, a hoist comprising a frame, a driven shaft, a driven member, a drive connection from the driven shaft to the driven member, cranks rigidly connected to the said driven shaft, a driving member, said driving member adapted to turn freely on the driven shaft through a partial revolution, a lug on the said driving member said lug adapted to engage the cranks on the driven shaft and thereby rotate the said driven shaft in either direction, a brake band, a wall enclosing the said brake band, a lever, connections between the lever and each end of the brake band, a connection between the lever and one of the said cranks, the arrangement such that the forward torque of the driven shaft contracts the band and the backward torque of the said driven shaft expands the said band, and the said lug on the driving member adapted to engage the lever whereby the backward torque of the driving member contracts the said band.

3. In combination, a hoist comprising a frame, an annular wall, a driven shaft, a crank rigid with the said driven shaft, a lever, a connection between the said crank and the said lever, a brake band within the said annular wall, connections from the lever to each end of the brake band, the connections such that the backward torque of the said crank expands the said brake band against its enclosing wall, a second crank rigid with the driven shaft, a driving member adapted to turn freely on the driven shaft through a partial revolution, a lug on the said driving member, the said lug adapted to engage the lever and the cranks on the driven shaft, to thereby turn the said driven shaft in opposite directions, and to thereby contract the said brake band in either direction of rotation.

4. In combination, a hoist comprising a frame, a driving member, a lug, a connection between the said lug and the said driving member, a driven shaft, an eccentric member on the said driven shaft and rigid therewith, a driven member, driving means from the driven shaft to the driven member, a circular wall on the said frame, a brake band within said wall, a lever, unequal arms on the said lever connecting the eccentric member to the respective ends of the brake band by pivotal connections, and the said lug adapted to engage the said lever and the said eccentric member.

5. In combination, a hoist comprising a frame, a driving member, a lug on the said driving member, a driven shaft, an eccentric member on the said driven shaft and rigid therewith, a circular wall, a brake band within said wall, a lever with unequal arms, a pivotal connection between the lever and the said eccentric member, pivotal connections between the unequal arms of the said lever and the respective ends of the brake band, a second member rigid with the said driven shaft, and the lug adapted to engage the said second member, the eccentric member and the lever.

6. In combination, a hoist comprising a frame, a driving member, a driving lug, a connection between the driving member and the driving lug, a driven shaft, a crank on the said driven shaft and rigid therewith, a driven member, a drive connection from the driven shaft to the driven member, a brake band, an annular seat enclosing the said brake band, a lever with unequal arms said lever pivoted to the said crank, connections from the ends of the brake band to the said unequal lever arms, and the said lug adapted to engage the crank and the lever on opposite sides of the driven shaft.

7. In combination, a hoist comprising a frame, a driving member, a driving lug on the said driving member, a driven shaft, a crank on the driven shaft and rigid therewith, a brake band, an annular seat enclosing said brake band, a lever, a pivotal connection between the lever and the said crank, pivotal connections between the ends of the brake band and the lever at unequal distances from the said first pivotal connection, the said lug adapted to engage the said crank and thereby rotate the driven shaft in the direction of lift, the said lug adapted to engage the said lever on the side of the driven shaft opposite to the said crank, and means whereby the said driving member rotates the said driven shaft in the direction of lowering.

8. In combination, a hoist comprising a frame, a driving member, a lug on the said driving member, a driven member, a drive connection from the driving member to the driven member, a brake band, an annular seat around the said brake band, a lever with unequal arms, connections from the said unequal arms to the respective ends of the brake band, an eccentric connection from an element of the said drive connection to the said lever, and the said lug adapted to engage the said lever and the eccentric connecting member, and to thereby turn the lever in the same direction about the ends of the band as the said lug turns in opposite directions.

In testimony whereof, I have signed my name to this specification in the presence of two subscribing witnesses, this 12th day of January, 1920.

JOHN W. KITTREDGE.

Witnesses:
L. W. CARLSON,
E. J. WRIGHT.